US008616979B1

(12) United States Patent
Daniel

(10) Patent No.: US 8,616,979 B1
(45) Date of Patent: Dec. 31, 2013

(54) INTERACTIVE GAME SYSTEM AND METHOD USING LOCATION DETERMINING MEANS

(76) Inventor: Isaac S. Daniel, Miramar, FL (US)

( * ) Notice: Subject to any disclaimer, the term of this patent is extended or adjusted under 35 U.S.C. 154(b) by 33 days.

(21) Appl. No.: 13/253,880

(22) Filed: Oct. 5, 2011

Related U.S. Application Data

(60) Provisional application No. 61/389,797, filed on Oct. 5, 2010.

(51) Int. Cl.
*A63F 13/00* (2006.01)
(52) U.S. Cl.
USPC .................. 463/42; 463/20; 463/39; 463/40; 463/46
(58) Field of Classification Search
USPC ..................................... 463/20, 39, 40, 42, 46
See application file for complete search history.

(56) References Cited

U.S. PATENT DOCUMENTS

| | | | | |
|---|---|---|---|---|
| 8,162,756 B2* | 4/2012 | Amaitis et al. | .................. | 463/42 |
| 8,282,491 B2* | 10/2012 | Auterio et al. | .................. | 463/42 |
| 8,307,029 B2* | 11/2012 | Davis et al. | .................... | 709/203 |
| 2011/0111836 A1* | 5/2011 | Acres | .............................. | 463/25 |
| 2012/0058826 A1* | 3/2012 | Amaitis et al. | .................. | 463/42 |
| 2012/0071244 A1* | 3/2012 | Gillo et al. | ........................ | 463/42 |
| 2012/0196686 A1* | 8/2012 | Karsten | ............................ | 463/42 |

OTHER PUBLICATIONS

Stern, Joanna, "SXSW: Google's Talking Shoe Motivates You to Move," Yahoo! News, (Austin), http://news.yahoo.com/blogs/abc-blogs/sxsw-googles-talking-shoe-motivates-move-141507194--abc-news-tech.html, Apr. 4, 2013.

* cited by examiner

*Primary Examiner* — Arthur O. Hall
*Assistant Examiner* — Shahid Kamal
(74) *Attorney, Agent, or Firm* — Carol N. Green, Esq.

(57) ABSTRACT

A system and method comprising of a social networking game system comprising of: a standalone, wearable gaming device configured for activating an application program stored on a mobile displaying device, wherein the application program is configured for activating location determining means to start a monitoring session, and wherein the location determining means is also configured for tracking a game player's moving parameters during the monitoring session; the application program is further configured for converting the game player's moving parameters into game player's statistics; and communication means positioned within the mobile displaying device for transmitting the game player's statistics to at least one remote server, wherein the at least one remote server includes at least one processor and computer executable instructions readable by the at least one processor and operative to conduct a game.

24 Claims, 10 Drawing Sheets

INTERACTIVE GAME SYSTEM AND METHOD USING LOCATION DETERMINING MEANS

PRIORITY CLAIM

The present application claims priority to U.S. Provisional Patent Application Ser. No. 61/389,797 titled:. Interactive Game System and Method Using A Location Determining Device, filed Oct. 5, 2010. The entire disclosure of the Non-Provisional Patent Application is incorporated herein by reference as though fully stated herein.

FIELD

The present disclosure relates generally to electronic systems, apparatuses, and methods, and more particularly, to systems, methods, and various other disclosures related to electronic interactive games.

BACKGROUND

Interactive games have evolved over the years allowing individuals to play games of their choice in the comfort of their homes by wearing certain handheld devices with sensors to capture their movements as they perform simulated sports or gaming activities that run concurrently with stored or streamed content. However, these games are not portable and for the rare few that are, capturing the player's gaming information either require transporting a significant amount of equipment or the game is premised on simplistic hand gestures or maneuvers. Player participation is therefore generally relegated to simulated sports activities rather than actual sports activities and effectively confines the game player to his/her home.

Health experts have repeatedly expressed concerns for the long term effects resulting from spending too much time passively viewing content as opposed to engaging in actual physical activity. Thus, there is a need for interactive games to incorporate actual sporting activities into the gaming experience, freeing the game player to play the interactive game either indoors or outdoors depending on the type of sporting activity involved. For example, instead of a game player simulating riding a skateboard or making hand gestures with an interactive game to simulate a boxing match, the gaming experience would incorporate the actual skateboarding activity outdoors or a real live boxing event indoors. In this manner, the gaming experience provides for a more energetic, active game and a more enjoyable and dynamic experience. The invention described herein satisfies this long felt need that heretofore has not been resolved by the prior art.

SUMMARY

The various systems and methods described herein result from the realization that content can be made more interactive, entertaining, and enjoyable by a social networking game system comprising of: a standalone, wearable gaming device configured for activating an application program stored on a mobile displaying device, wherein the application program is configured for activating location determining means to start a monitoring session, and wherein the location determining means is also configured for tracking a game player's moving parameters during the monitoring session; the application program is further configured for converting the game player's moving parameters into game player's statistics; and communication means positioned within the mobile displaying device for transmitting the game player's statistics to at least one remote server, wherein the at least one remote server includes at least one processor and computer executable instructions readable by the at least one processor and operative to conduct a game, wherein the game is configured for: receiving the game player statistics; identifying the game player's account for which the game player's statistics will apply; converting the game player's statistics into virtual mileage based on a correlation to actual distance travelled during the monitoring session; updating the game player's account to include the virtual mileage accumulated during the monitoring session; awarding virtual mileage to the game player for each crew member that accesses the game; displaying the game player's virtual mileage on the social networking game; and/or determining a winner for the game player with the most accumulated virtual mileage within a prescribed period.

DETAILED DESCRIPTION OF PREFERRED EMBODIMENTS

System Level Overview

Figure 1A:
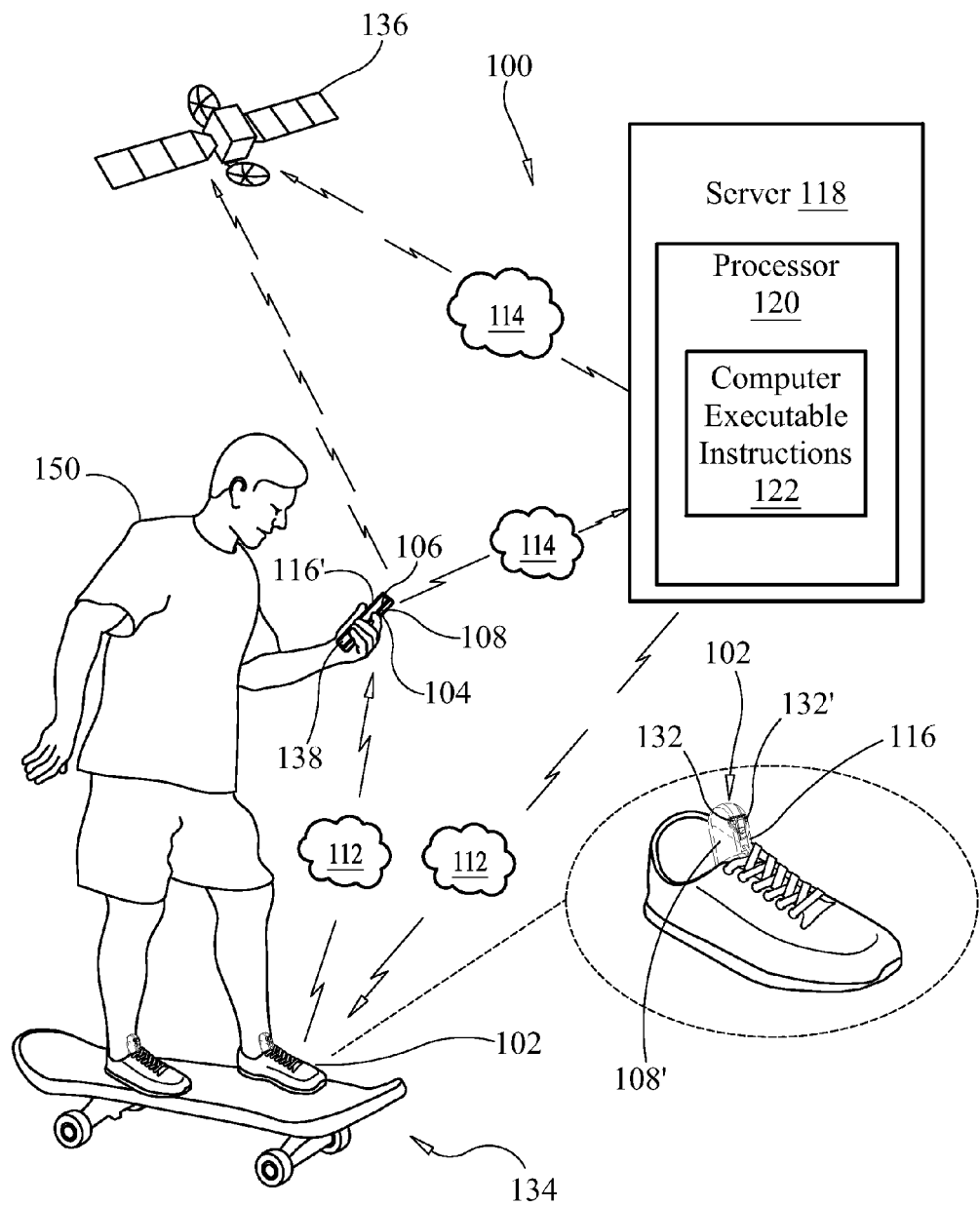
FIGS. 1A-1C show various embodiments of a system.
Figure 1B:
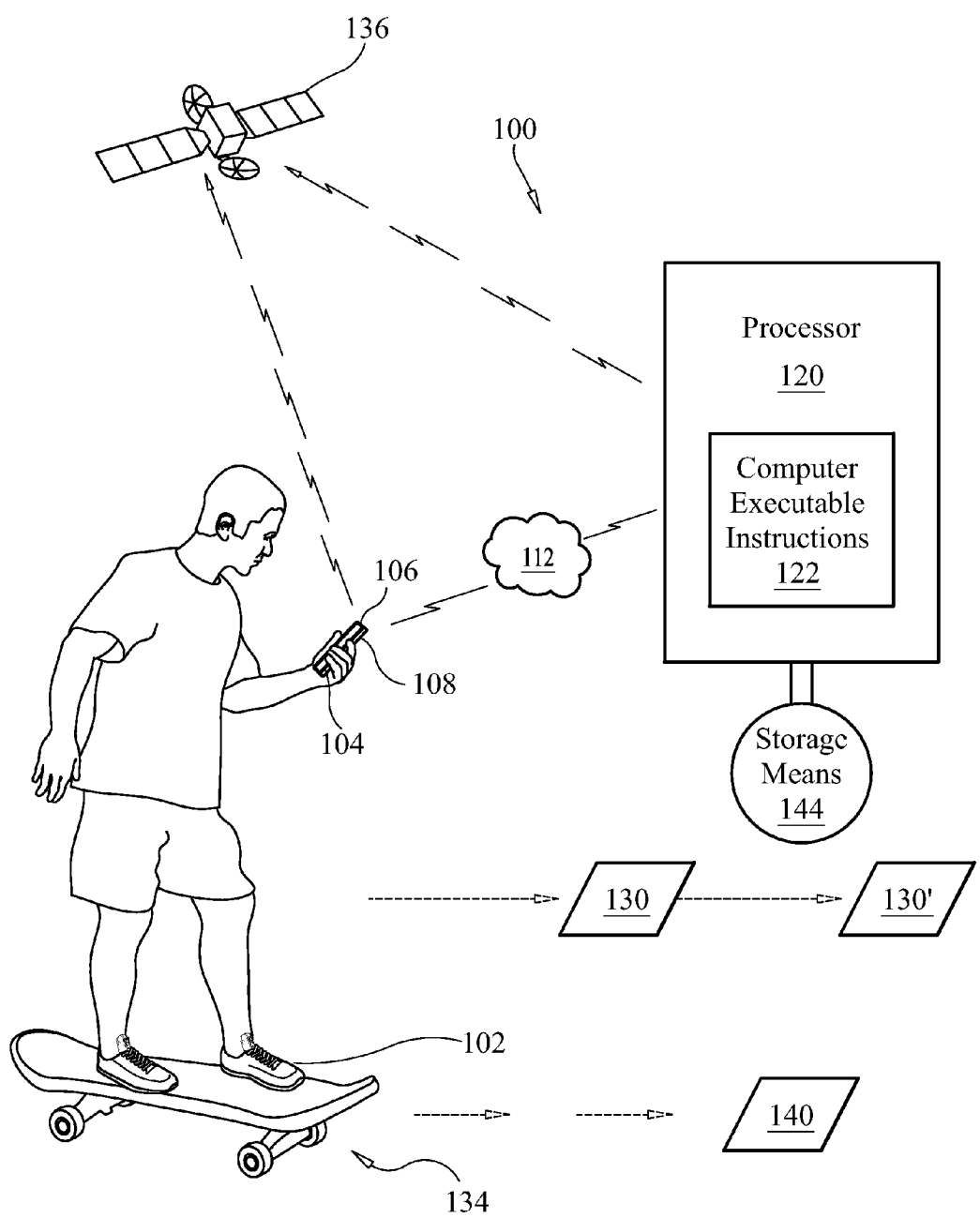
Figure 1C:
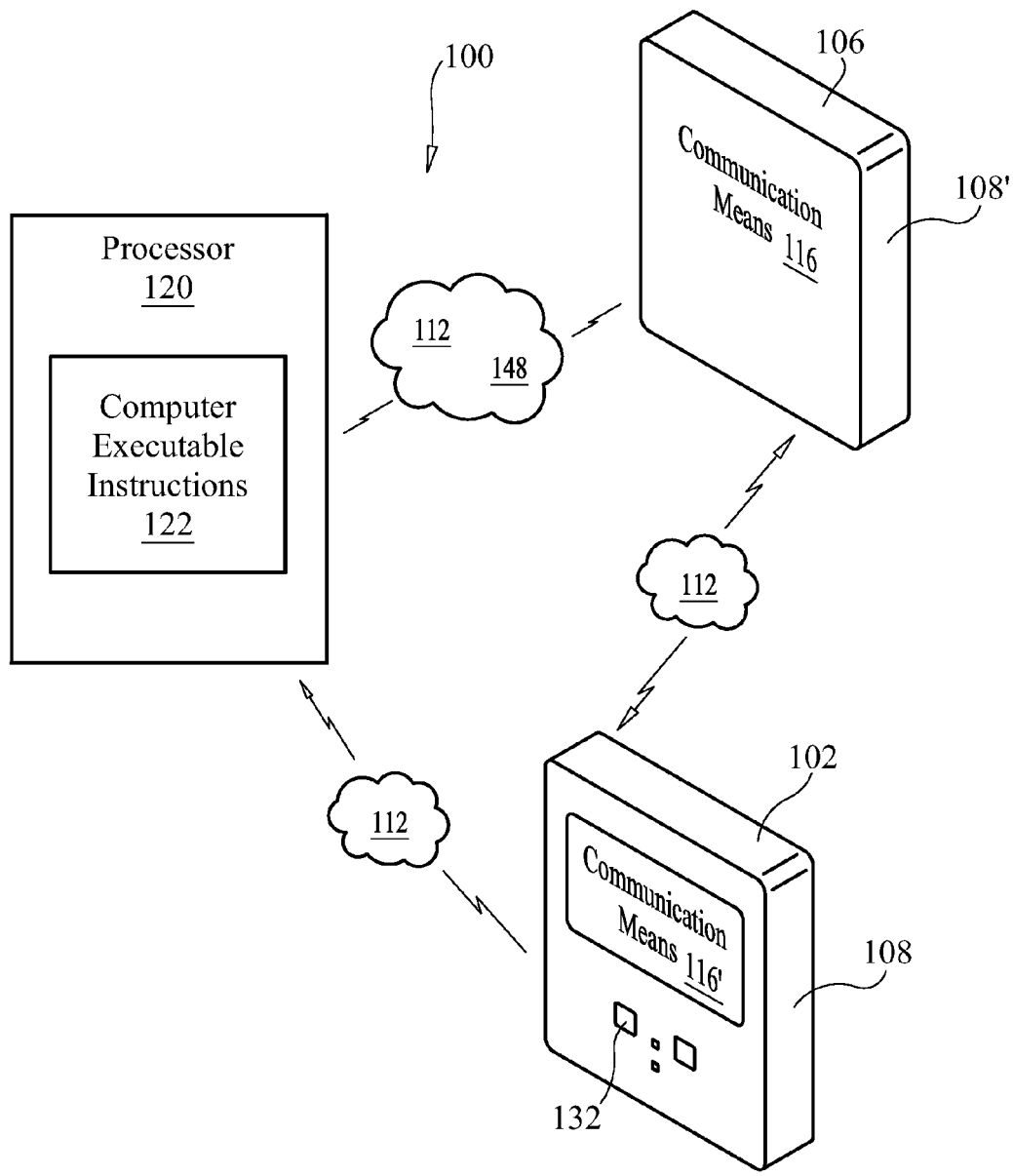

With reference to the drawings, FIG. 1A through FIG. 1C show embodiments of a social networking game system 100 comprising of: a standalone, wearable gaming device 102 configured for activating an application program 104 stored on a mobile displaying device 106, wherein the application program 104 is configured for activating location determining means 108 to start a monitoring session 110, and wherein the location determining means 108 is also configured for tracking a game player's moving parameters 112, 112' during the monitoring session 110 while the game players engaged during an actual, real live physical exercise and/or sporting activity; the application program 104 is further configured for converting the game player's moving parameters 112, 112' into game player's statistics 114; and communication means 116 positioned within the mobile displaying device 106 for transmitting the game player's statistics 114 to at least one remote server 118, wherein the at least one remote server 118 includes at least one processor 120 and computer executable instructions 122 readable by the at least one processor 120 and operative to conduct a game 124, wherein the game 124 is configured for: receiving remotely the game player statistics 114; identifying the game player's account 126 for which the game player's statistics 114 will apply; converting the game player's statistics 114 into virtual mileage 128 based on a correlation to actual distance travelled 130 during the monitoring session 110; updating the game player's account 126 in real-time to include the virtual mileage 128 accumulated during the monitoring session 110; awarding virtual mileage 128 to the game player for each crew member that accesses the game 124; displaying the game player's virtual mileage 128 in real time on the social networking game 124; or determining a winner for the game player with the most accumulated virtual mileage 128 within a prescribed period.

Referring to FIG. 1A, an exemplary standalone, wearable gaming device 102 is in electronic communication with a wireless, portable mobile displaying device 106. The wearable gaming device 102 is enabled for attachment to any one of the following: footwear, clothing apparel or accessories and the like, whereby accessories may include any one of the following: belts, hats, bags, satchels, chains, backpacks and other like accessories. In FIG. 1A, the wearable gaming device 102 is attached to the tongue of the game player's shoe. However, the portable gaming device 102 being removable may be removed from the shoe's tongue for removable attachment to any other portion of the game player's apparel or accessory.

Both gaming device 102 and/or the mobile displaying device 106 may include communication means 116, 116', respectively, for communicating with each other and/or with the remote server 118 by employing short range wireless protocol, such as, but not limited to, a radio frequency transceiver, a radio frequency receiver, and/or a radio frequency transmitter. In some embodiments, wireless communication means 116, 116' is a radio frequency receiver that may be any type of radio frequency receiver, including, but not limited to, a positioning system receiver, such as a global positioning system receiver and a local positioning system receiver, such as a Wi-Fi positioning system receiver. In other embodiments, communication means 116, 116' may employ wireless protocols like Blue Tooth, ZigBee, 802.11 series, or a wireless modem, such as, but not limited to, a global system for mobile communications (GSM) modem, or any other short range wireless protocol that is well known and used in the arts and other future wireless protocol suitable for transmitting and receiving data communications. In some embodiments, communication means 116, 116' include one or more combined wireless transceivers like a Zigbee and/or Bluetooth transceiver with integrated radio and shared antennae in mating engagement with an autonomous power supply 128 (not shown), e.g. a rechargeable battery.

The monitoring session 110 may be commenced by activating the gaming device 102, which may or may not include activation buttons 132, which in turn activates the application program 104 stored on the mobile displaying device 106 wherein both the gaming device 102 and the displaying device communicate via each other's communication means 116, 116'. Application program 104 may be any type of software application, such as a mobile application designed to run on a mobile platform, such as a mobile displaying device 106 running an operating system, such as IOS™, ANDROID™, WINDOWS MOBILE™, BLACKBERRY™, and the like. In another embodiment, the application program 104 may be designed to run on a social network platform, such as FACEBOOK™ OR JUSTSYNC™. Mobile displaying device 106 as used herein may be any kind of displaying device 106, such as, but not limited to, a cell phone, a personal digital assistant ("PDA"), a computer monitor, a projector, a laptop, an IPAD™, a television, a notebook, a tablet personal computer, IPHONE™, smart phones, mobile phones, a portable screen, a portable processing device and/or any other kind of WLAN communication devices that are readily used in the arts to display, transmit and/or receive wireless communications.

Mobile displaying device 106 is portable and may include a computer processor 120', with computer executable instructions 122' stored thereon and readable by the displaying device's computer processor 120', in electronic communication with the application program 104, displaying device's communication means 116' and/or the location determining means 108, whereby the processor's computer executable instructions 122' is programmed to access and control the application program 104, communication means 116' and/or the location determining means 108.

Application program 104 activates the location determining means 108 to start a monitoring session 110. Location determining means 108 may be positioned within the mobile displaying device 106 or the standalone, wearable gaming device 102. In either event, location determining means 108 is provided with a Global Positioning System (GPS) transponder 120 (not shown) with transmitting and receiving means for communicating with either via a geosynchronous (GEO) or Low Earth Orbit (LEO) satellite in a network to determine for example the location determining means' geographical coordinates and/or other moving parameters 112, 112'. Moving parameters 112, 112' may include but is not limited to any one or more of the following: geographical coordinates of the location determining means, actual distance travelled, speed, stride rate, cycling cadence, date, elevation reached, depth travelled, timestamp, a location determining means' unique identifier and a game player's unique identifier and or any other parameters associated with physical exercises 140, 140' that are known and used in the arts.

Upon activation, location determining means 108 orients itself and determines its geographical position, e.g. longitude and latitude coordinates by searching for signals of GPS satellite constellation, verifying whether it has direct access to a wireless communications network system 136, e.g. a satellite network system, and if so, it determines the geographical position of the location determining means 108 and consequently the game player. In some embodiments, location determining means 108 may include at least one processor 120" positioned within is in electronic communication with at least one sensor 138 and the communication means 116' such that the functionality of the location determining means 108 is centrally controlled by its at least one processor 120".

Location determining means' at least one sensor 138, e.g. an accelerometer, works in conjunction with the location determining means 108 to originate the moving parameters 112, 112' whereby, once the location determining means 108 is activated it uses the at least one sensor 138 for sensing game player's key performance metrics 140, 140' when engaged in physical exercises 140. Performance metrics 140, 140' may include but is not limited to speed, average speed, maximum speed (calculated and/or recorded every five or ten seconds), number of sprints, distance, distance at high intensity levels, steps, heart rate, heart rate and/or stride rates.

Physical exercise 134 as used herein is selected from the group consisting essentially of: walking, sprinting, running, dribbling, jumping, batting, swinging, shooting, scoring a goal, skateboarding, lifting, jogging, swimming, hiking, skiing, boxing, snowboarding, dancing, diving, driving, flying, surfing, cycling, sliding, gliding, hurling, bending, pitching, throwing and/or any other physical activity.

The at least one sensor 138 may be any type of sensor, including, but not limited to, an accelerometer, or gyroscopic sensor camera. In some embodiments, the at least one sensor 138, includes an infrared camera, a panoramic sensor, a stereo sensor, a three dimensional sensor and/or camera ("3D sensor"), a thermal imaging camera, a video sensor, a digital camera, and the like. In some embodiments, location determining means 108 includes an activation button 130 in electrical communication with or electronically connected to the at least one sensor 138 such that the activation button 130 may be used to manually activate or deactivate the location determining means 108 to start or stop sensing the game player's performance metrics 140, 140' during a monitoring session 110 where the game player is engaged in physical exercise 134.

As seen in FIG. 1A, gaming device 102 is small enough to be fitted in the tongue of a shoe, e.g. sneaker or boots, or may be placed in the game player's pockets, backpack, purse or anywhere else on the person that he/she feels comfortable wearing or carrying the device as an accessory as the gaming device 102 may be removable. Here, game player is situated on a moving skateboard and the gaming device 102. Once the location determining means 108' within the gaming device 102 or the displaying device 106 is activated, as the game player skateboards, the location determining means 108' at least one sensor 138 senses the game player's performance metrics 140, 140' during physical exercise 114, i.e. skateboarding activity and the location determining means 108' determines moving parameters, 112, 112', e.g. the geographical position of the location determining means 108 or actual distance travelled 130. Once the moving parameter 112 has been generated, location determining means 108 transmits the at least one moving parameter 112 via its communication means 116' to the displaying device's communication means 116 for remote tabulations of a game player's statistics 114 that are associated with the location determining means 108 and/or the game player 116. In some embodiments, another game player is able to view the game player actively engaging in the physical exercises 114 incremental virtual mileage 128 as it is being uploaded to the game player's account 126.

In FIG. 1B, no gaming device 102 is required and the exemplary location determining means 108 is positioned within the displaying device 106 with direct access to a wireless communications network system 126. The displaying device's communication means 116 may communicate remotely with the at least one processor 120 via either a geosynchronous (GEO) or Low Earth Orbit (LEO) satellite in a wireless communications network system 136. Communications between the gaming device 102 and the remote processor 120; as well as the communications between the at least one processor 120 and the displaying device 106 are bi-directional. In this manner, either the gaming device 102 or the displaying device 106 may communicate directly with the at least one processor 120.

Upon activation of the displaying device 106, the location determining means 108 is activated for a monitoring session 110 and the at least one sensor 138 positioned within senses the game player's key performance metrics 140, 140' during physical exercise 134, thereby originating the at least one moving parameter 112 for the game player. Once the at least one moving parameter 112 has been generated, the displaying device's communication means 116' transmits the at least one moving parameter 112 to the remote processor 120 in real time, for remote tabulations of a game player's statistics 114 for the game player's account 142 associated with the displaying device 106.

In some embodiments, at least one processor(s) 120, 120' may be any type of processor, including, but not limited to, a single core processor, a multi core processor, a video processor, and the like.

As shown in FIGS. 1A & 1B, the computer executable instructions 122 may be loaded directly on at least one processor 120 or may be stored on storage means 144, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like.

Computer executable instructions 122 may be any type of computer executable instructions 122, which may be in the form of a computer program, the program being composed in any suitable programming language or source code, such as C++, C, JAVA, JavaScript, HTML, XML, and other programming languages. Computer executable instructions 122 readable by the at least one processor 120 and operative to conduct a game 124, wherein the game 124 is further configured for: awarding virtual mileage 128 for actual distance travelled 130 which correspond to a virtual mileage 128 requirement for navigating through e.g. a virtual city; awarding virtual mileage 128 based on the game player successfully navigating through a challenge; conferring a rank 146 to the game player based on a totality of accumulated virtual mileage 128; awarding prizes to top earners of accumulated virtual mileage 128 within a prescribed period; requiring the game player to complete individual tricks in order to be promoted to a different game level; updating the game player's statistics 114 or rank 146 based on the received at least one moving parameter 112; or transmitting to or receiving game content 148 from the displaying device 106, which may be displayed on the displaying device's displaying means.

Figure 2A:
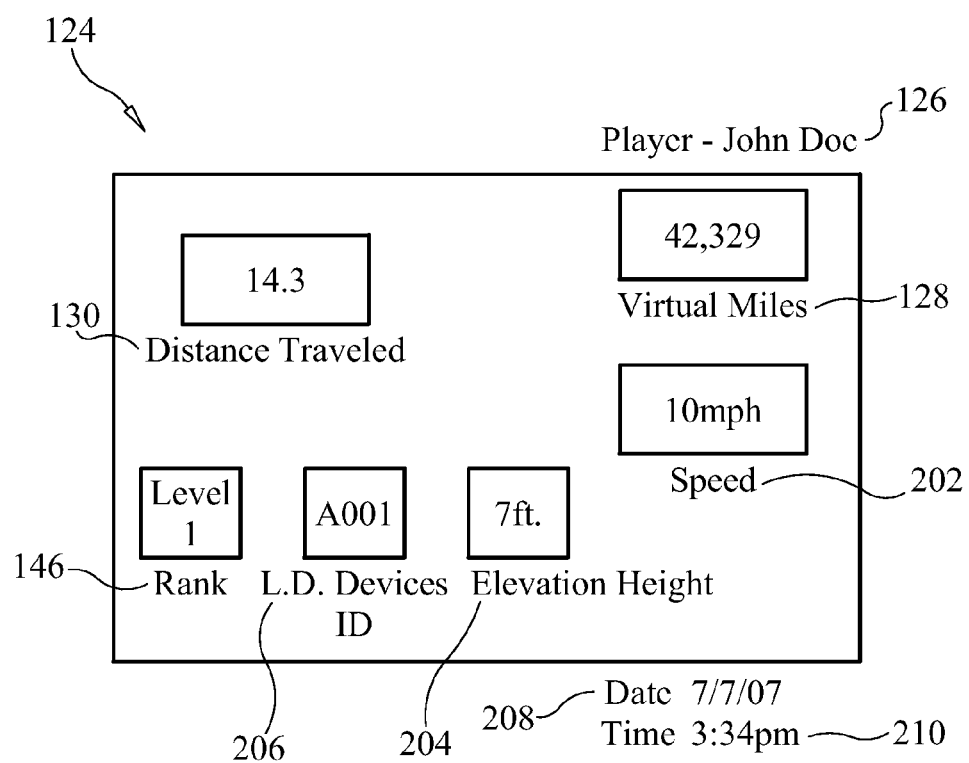
FIG. 2A shows an exemplary illustration of the game.

FIG. 2A shows an exemplary illustration of a snapshot of the game 124. In some embodiments, computer executable instructions 122 are operative to conduct a game 124 based on the received at least one moving parameter 112, where upon receipt of the received at least one moving parameter 112, the computer executable instructions 122 are operative to convert the received at least one moving parameter 112 to game player's statistics 114 for the game player associated with the gaming device 102 and/or the location determining means 108.

Computer executable instructions 122 are further operative to use the converted at least one moving parameter 112 to update the game player's statistics 114 and/or rank 146 in the game 124 based on the received at least one moving parameter 112. Game player's statistics 114 as used herein include but is not limited to: distance travelled 130, virtual miles 128, speed 202, rank 146, elevation height 204 or any other game player statistics 114 that are known and used in the arts. In some embodiments, game player's rank 146 improves as the accumulated virtual miles 128 increases. Also displayed may be the location determining device's unique identifier 206, the date stamp 208 and timestamp 210.

In some embodiments, an object of the game 124 is to earn as many virtual mileage 128 as possible and/or attain a higher game player's rank 146 within a predetermined period, e.g. one month, 6 weeks, 6 months, 1 year, and the like, where the game 124 may automatically refresh at the end of any such predetermined cycle thereby allowing a game player 150 to compete with other game players 150, 150' to win that predetermined period's competition regardless of how long the game player 150 has been playing the game 124. In some embodiments, actual or virtual prizes, ranks 148, 148' and/or titles may be awarded for the game player 150 with the most virtual mileage 128 and/or highest rank 146 at the end of the predetermined cycle. Virtual mileage 128 travelled may represent a combination of: (i) actual distance travelled 130 by game player when engaged in actual sports activities being sensed by an activated location determining means 108 where the game player's performance metrics 140, 140' are captured and transmitted as moving parameters 112, 112' that are tabulated remotely and added to the game player's statistics 114;

(ii) virtual mileage 128 may be purchased using game tokens, real or virtual currency or random virtual mileage 128 awarded (e.g. 1-5 virtual miles) for performing certain activities, e.g. accessing or logging into the game 124 within a specified time period, e.g. 24 hours; (iii) virtual mileage 128 awarded by the processor 120 each time a game player's crew member 118' logs into the game 124; and/or (iv) virtual mileage 128 earned for completing certain game challenges or tricks 212 (collectively "challenges 212") that may be specific to a particular rank 146 and may be directly related to the particular sports activity. For example, in one embodiment, a challenge 212 may require the game player to complete actual skateboarding of an actual or virtual park which includes ramps and the like, while in another embodiment, the challenge 212 may be related to the number of dunks accomplished in an actual or virtual basketball game 124.

In some embodiments, a challenge 212 may require game player to complete a virtual mileage 128 requirement for a given city and/or master any tricks 212, 212' associated with that city in order to advance in the game 124. Tricks 212 may be randomly generated virtual challenges 208 which when played includes an avatar engaging in a related virtual sports activity for which the game player may/may not have any input or control as to the outcome of completed trick 208. Nonetheless, game player may earn or lose virtual mileage 128 or symbols of mastery of the trick, e.g. a virtual accessory like a white hat, virtual money, virtual hearts, etc., depending on the outcome of the trick 208. For example in some embodiments, game player is awarded a certain number of hearts and/or virtual currency at the outset of the game 124, which are depleted by attempting tricks 212 according to the level of difficulty involved. As the game player advances through the various tricks 212, 212' and/or challenges 208, game player is awarded additional symbols of mastery, hearts and the like and/or receives a new rank 146. In some embodiments, game player may be required to master certain tricks 212 by attempting the trick 208 at least one or more times before game player is considered a master of the trick 208 and obtain a new rank 146.

In some embodiments of the game 124, the individual's game player's rank 146 as displayed is representative of the level attained based on the number of virtual mileage 128 he/she earned within the predetermined cycle 210 (not shown). In other embodiments, rank 146 is additionally representative of a comparison of the level attained by game player as compared to other game players 150, 150', for example the top ten game players 150, 150'. In either embodiment, as discussed supra, at the end of the predetermined cycle 210 (not shown) game player's rank 146 may be reset for the beginning of a new game 124. In certain embodiments the rank 146 may be exemplified by a written description, e.g. Rookie, Amateur, professional, veteran, Master", while in other embodiments the rank is exemplified by a pictorial depiction, e.g. an icon symbolizing the level of accomplishment as per the rules of the game 124.

In some embodiments, a game player's statistics 114 may improve depending on the activities of other game players 150, 150', 150" whom the game player of the location determining means 108 has preselected to be a part of his/her crew. For example, game player may earn virtual mileage 128 each time a crew member 118' access the game 124 by logging on and/or reaches a new rank 146 in the game 124. In some embodiments, game player's rank 146 improves by purchasing virtual mileage 128 travelled for a monetary fee using actual currency, virtual currency and/or tokens, and/or trading virtual accessories directly for virtual mileage 128 or for virtual currency to purchase virtual mileage 128, all of which may have a direct impact on a game player's rank 146.

In some embodiments, computer executable instructions 122 are operative to determine game player's virtual mileage 128 based on the game player's 20 at least one moving parameter 112 transmitted by or received from the at least one location determining means 108 or the displaying device 106. Computer executable instructions are further operative to update a game player's statistics 114 and/or rank 146 based on the received at least one or a plurality of moving parameter 112, 112'.

Figure 2B:
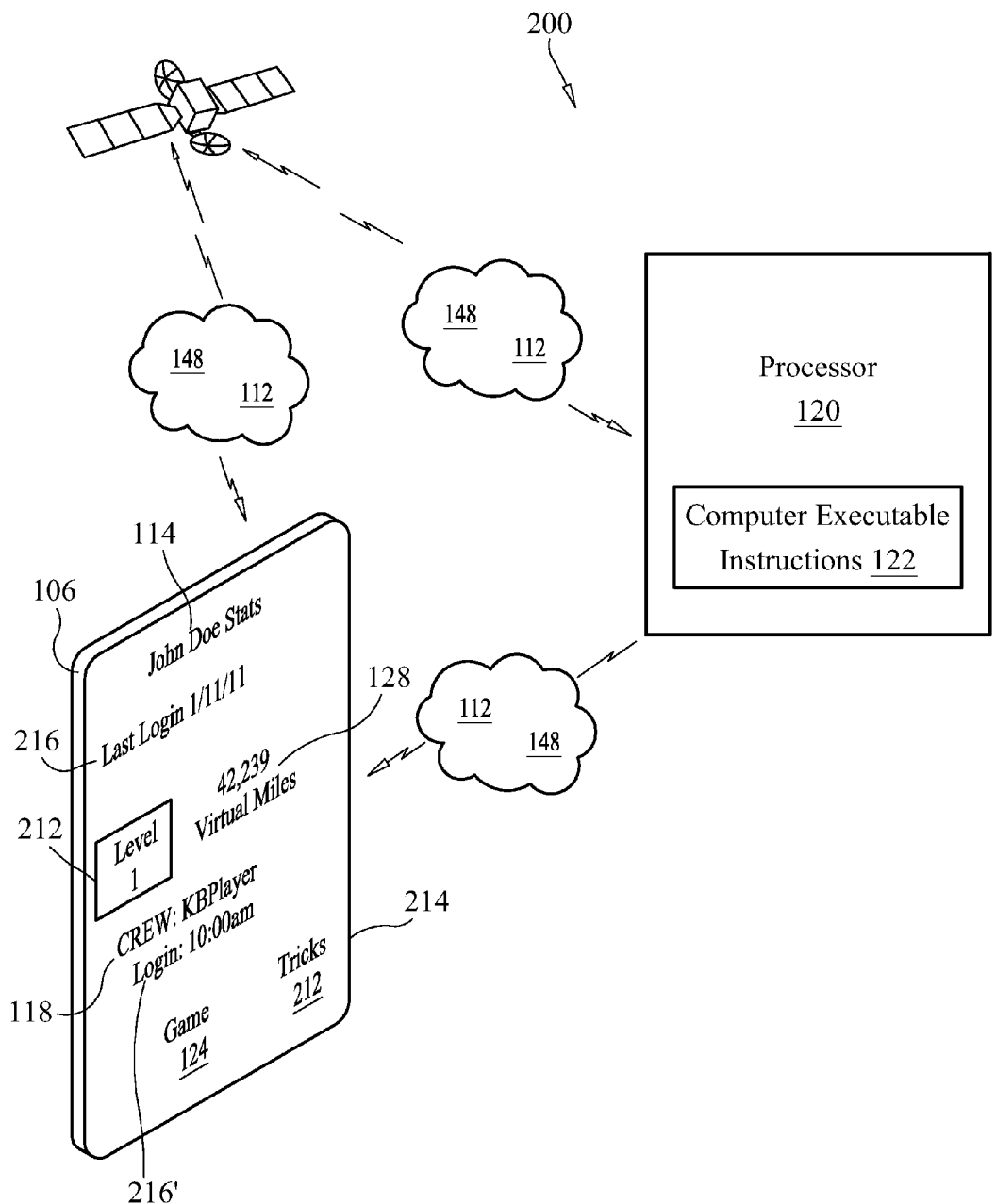
FIG. 2B shows an exemplary illustration of the game using a displaying device according to one embodiment.

FIG. 2B shows an exemplary illustration of a snapshot of the game 124 as displayed on a displaying device 106 according to one embodiment. In some embodiments, computer executable instructions 122 may be operative to transmit or receive game content 148 as it would appear on a social network game 124, which may be displayed on the displaying device 106. Illustratively, computer executable instructions 122 may update a game player's statistics 114 and transmit the updated game player's statistics 114 to the displaying device 106, where the game player may view his/her statistics 114 in real time as the application program 104 runs in the background. In another embodiment, displaying device 106 may include its own processor 120', which includes computer executable instructions 122 operative to update the game player's statistics 114 that are transmitted to and received by the processor 120 such that the information stored on the displaying device 106 and the processor 120 are synchronized.

Displaying device 106 is equipped with at least one or more displaying means 214 (not shown) for displaying game content 148. Displaying means 214 (not shown) may include but is not limited to a liquid crystal display ("LCD") or light emitting diode ("LED") type, plasma, touch screen or any other types of displays that are well known and used in the arts. Displaying device 106 may display the game content 148 either in text and/or visual format. In some embodiments, displaying device 106 may display game content 148, which may include an update in realtime of game player's statistics 114 and/or rank 146. Game content 148 as used herein may be any type of content, including but not limited to, game player's statistics 114, login status 214, crew member's login status 214', login history 216 (not shown), and crew member's game player's statistics 114', and the like. In other embodiments, game player may access his or her game player's statistics 114 from an application accessible from a media website, e.g. FaceBook, where game player may view his/her game player's statistics 114 as updated by the processor 120 using the at least one moving parameter 112 transmitted by the displaying device 106 or the location determining means 106.

Accordingly, in the various embodiments, when the location determining means 108 has been activated, the game player's at least one physical movement 114, can be measured and the moving parameter originating 108 from the location determining means 108 or the displaying device 106 can be incorporated into a game 124. Thus, any type of physical exercises 140, 140', including but not limited to, a walking movement, a running movement, a dribbling movement, a jumping movement, a batting movement, a swinging movement, a shooting movement, a scoring a goal movement, a skateboarding movement, a lifting movement, a jogging movement, a swimming movement, a hiking movement, a skiing movement, a boxing movement, a snowboarding movement, a dancing movement, a diving movement, a driving movement, a flying movement, a surfing movement, a cycling movement, a sliding movement, a gliding movement, a hurling movement, a bending movement, a pitching movement, a throwing movement and the like, as experienced outdoors or indoors can be incorporated into the game 124.

In another embodiment, the computer executable instructions 122 may be operative to use communication means 116 for transmitting or receiving the moving parameters 112, 112' or the game content 148, wherein the communication means 116 may comprise a wired communications means, such as a land line modem, cable modem, DSL modem, and the like, or a wireless communications means, such as a wireless modem, a GSM modem, a satellite modem, and Wi-Fi adapter, and the like.

In some embodiments, system 100 may be integrated with or may be a component of a user system or a central station, such as a computer, a gaming console, a set top box, a displaying device, or a server.

Figure 3:
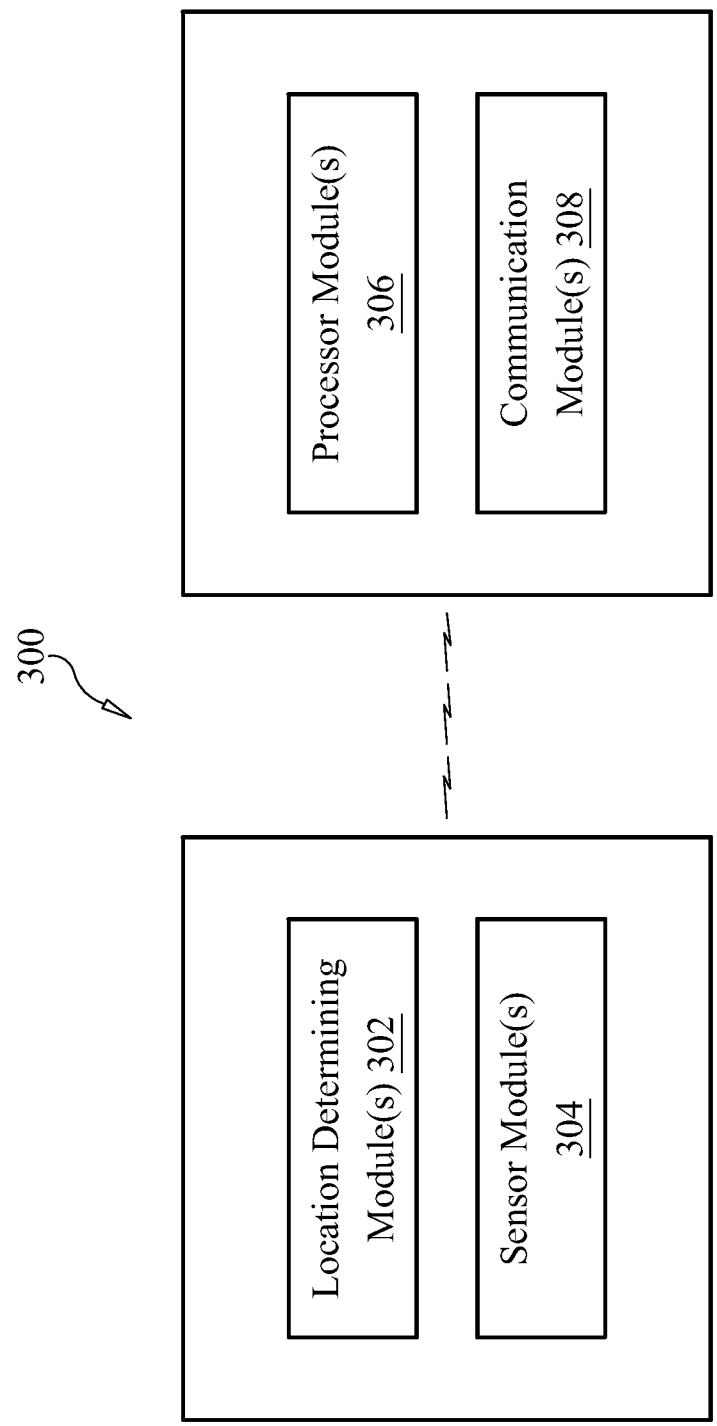
FIG. 3 shows a system in accordance with one embodiment.

Referring now to FIG. 3, one embodiment of system 300 is shown, comprising of at least at least one location determining module 302 in communication with at least one sensor module 304 to sense game player's performance metrics 140, 140', translate the performance metrics 140, 140' into the at least one moving parameter 112 and transmit the at least one moving parameter 112 to at least one processor module 306 for tabulations of a game player's statistics 114 that are associated with the at least one location determining module 302, and wherein the at least one processor module 306 updates the game player's statistics 114, e.g. virtual mileage 128 or rank 146 based on the received at least one moving parameter 112; and at least one communications module 308 to transmit or receive the at least one moving parameter 112.

In one embodiment the at least one processor module 306 may comprise a software aspect, such as, but not limited to, processing software, such as processing computer program, an operating system, and the like. In another embodiment, at least one processor module 306 may comprise of a hardware aspect, such as a computer processor 120. In some embodiments, at least one processor module 306 may be any type of processor, including, but not limited to, a single core processor, a multi core processor, a video processor, and the like. In yet another embodiment, at least one processor module 306 may comprise both a software aspect and a hardware aspect.

In some embodiments, at least one location determining module 302 may comprise of a hardware aspect, such as, but not limited to, a sensor 138. In such embodiments, at least one location determining module 302 may include any type of sensor 138, including, but not limited to, an accelerometer, or gyroscopic sensor camera. In some embodiments, the at least one sensor 138, includes an infrared camera, a panoramic sensor, a stereo sensor, a three dimensional sensor and/or camera ("3D sensor"), a thermal imaging camera, a video sensor, a digital camera, and the like. Accordingly, performance metrics 140, 140' as previously defined herein can be sensed to and incorporated into the system 300 of the invention.

In yet another embodiment, at least one location determining module 302 may comprise a software aspect, such as a computer program. In such an embodiment, at least one location determining module 302 may comprise sensor and/or camera firmware. In yet another embodiment, at least one location determining module 302 may comprise both a software aspect and a hardware aspect.

In one embodiment, at least one processor module 306 may be electronically connected, electronic communication, or in software communication with at least one location determining module 302.

In a further embodiment, system 300 comprises at least one display module 310 to display the at least one piece of game content 148. The at least one display module 310 may comprise a hardware aspect, such as a displaying device 106, which may include, but is not limited to, may be any kind of displaying device 106, such as, but not limited to, a cell phone, a personal digital assistant ("PDA"), a computer monitor, a projector, a laptop, an ipad, a television, a notebook, a tablet personal computer, iPhone, smart phones, mobile phones, a portable screen, a portable processing device and/or any other kind of WLAN communication devices that are readily used in the arts to display, transmit and/or receive wireless communications. In another embodiment, the at least one display module 310 may comprise a software aspect, such as a display computer program or software, such as, but not limited to, a media player, display drivers, and the like. In yet another embodiment, the at least one display module 310 may comprise both a hardware aspect and a software aspect.

In yet another embodiment, system 300 may comprise at least one communications module 308 to transmit or receive game information. Game information may comprise any type of information, such as, but not limited to, information based on the moving parameters 112, 112' and/or game content 148, and/or such as those types of information described above with reference to FIGS. 1 through 2B. Game content 148 as used herein may be any type of content, including but not limited to, game player's statistics 114, login status 214, crew member's login status 214', login history 216 (not shown), and crew member's game player's statistics 114', and the like.

In one embodiment, the at least one communications module 308 may comprise a hardware aspect, such as but not limited to, wireless communications hardware, such as, but not limited to, a wireless modem, a GSM modem, a Wi-Fi modem, an antenna, a satellite modem, a Bluetooth modem, and the like, or wired hardware, such as a DSL modem, a cable modem, a network card, a telephone modem, and the like. In yet another embodiment, the at least one communications module 308 may comprise a software aspect, such as, but not limited to, a computer program or software, such as, but not limited to, a communications program, communications protocol, and the like. In yet another embodiment, the at least one communications module 308 may comprise both a hardware aspect and a software aspect.

In some embodiments, the at least one processor module 306 is operative to conduct a game 124 based on at least one moving parameter 112 received from either the location determining module 302 and/or a display module 310, as used and/or worn by the game player. Upon receipt of game player's at least one moving parameter 112, the at least one processor module 306 is operative to determine game player's virtual mileage 128 based on game player's at least one moving parameter 112 that was received from either the at least one location determining module 302 or the display module 310. Processor module 306 is operative to use at least one moving parameter 112, e.g. distance travelled 130, to update game player's statistics 114, e.g. game player's virtual mileage 128, by adding for example the actual distance travelled 130 to game player's virtual mileage 128. As previously discussed in conjunction with FIGS. 1A-3, as game player's virtual mileage 128 increase his/her game statistics 114 and/or rank 146 may improve. Accordingly, the at least one processor module 306 is operative to confer a new rank 146 to the game player based on at least one received moving parameters 112, 112'.

In some embodiments, at least one processor module 306 may be operative to transmit or receive game content 148, which may be displayed via a display module 310. Illustratively, the at least one processor module 306 may contain computer executable instructions 122 which may be programmed to update a game player's statistics 114 and transmit the updated game player's statistics 114 to be displayed via a display device 106. Display module 310 may be in electrical or wireless communication with at least one or more displaying means 214 (not shown) for displaying game content 148. Displaying module 310 may be enabled to display the game content 148 on the displaying device in either in text and/or visual format, where game content may include an update in realtime of game player's statistics 114 and/or rank 146. Game content 148 as used herein may be any type of content, including but not limited to, game player's statistics 114, login status 214, crew member's login status 214', login history 216 (not shown), and crew member's game player's statistics 114', and the like. In other embodiments, game player 150 may access his or her game player's statistics 114 from an application accessible from a media website, e.g. Facebook, where game player 150 may view his/her game player's statistics 114 as updated by the processor 120 using the at least one moving parameter 112 transmitted by the displaying device 106 or the location determining means 106.

Figure 4:
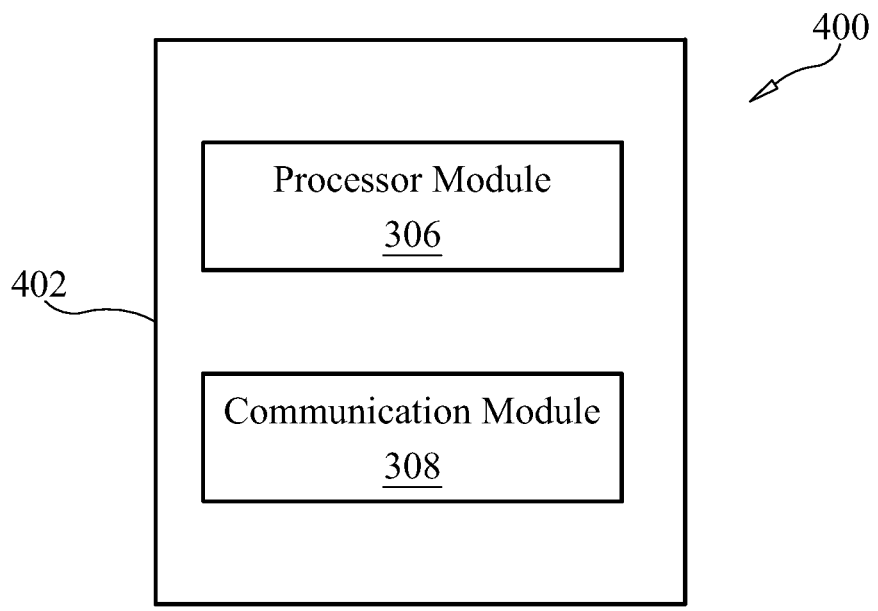
FIG. 4 shows a system in accordance with another embodiment.

FIG. 4 shows a system 400 in accordance with one embodiment, wherein system 400 comprises of at least one processor module 306 to update game players statistics 114 and/or rank 146 based on received at least one moving parameters 112, 112' from a location determining means 108 and/or a displaying device 106, and at least one communications module 308 to transmit or receive at least one moving parameter 112 and/or game content 148.

In one embodiment at least one processor module 306 may comprise of a software aspect, such as, but not limited to, processing software, such as processing computer program, an operating system, and the like. In another embodiment, at least one processor module 306 may comprise a hardware aspect, such as a computer processor. In some embodiments, at least one processor module 306 may be any type of processor, including, but not limited to, a single core processor, a multi core processor, a video processor, and the like. In yet another embodiment, at least one processor module 306 may comprise both a software aspect and a hardware aspect.

Game content 148 as used herein may be any type of content, including but not limited to, game player's statistics 114, login status 214, crew member's login status 214', login history 216 (not shown), and crew member's game player's statistics 114', and the like as described above with reference to FIGS. 1 through 3.

In one embodiment, at least one communications module 308 may comprise a hardware aspect, such as but not limited to, wireless communications hardware, such as, but not limited to, a wireless modem, a GSM modem, a Wi-Fi modem, an antenna, a satellite modem, a Bluetooth modem, and the like, or wired hardware, such as a DSL modem, a cable modem, a network card, a telephone modem, and the like. In yet another embodiment, at least one communications module 308 may comprise a software aspect, such as, but not limited to, a computer program or software, such as, but not limited to, a communications program, communications protocol, and the like. In yet another embodiment, at least one communications module 308 may comprise both a hardware aspect and a software aspect.

In yet another embodiment, system 400 may comprise of at least one server module 402 to host a game 124. In some embodiments, the game 124 may be a game 124 based on a game player accumulating the highest number of virtual mileage 128 as possible and/or attain the highest game player's rank 146 within a predetermined cycle, e.g. one month, 6 weeks, 6 months, 1 year, and the like. In accomplishing the highest number of virtual mileage 128 and/or the highest rank 146 game player may be required to earn virtual mileage 128 in the manner previously described in conjunction with FIGS. 1-3.

In some embodiments, the at least one server module 402 may comprise of a hardware aspect, such as but not limited to, server hardware, such as, but not limited to, a server processor 120, a server computer, and the like. In yet another embodiment, the at least one server module 402 may comprise a software aspect, such as, but not limited to, a computer program and/or software, such as, but not limited to, server software, game hosting software, and the like. In a further embodiment, the at least one server module may comprise both a software aspect and a hardware aspect.

Figure 5:
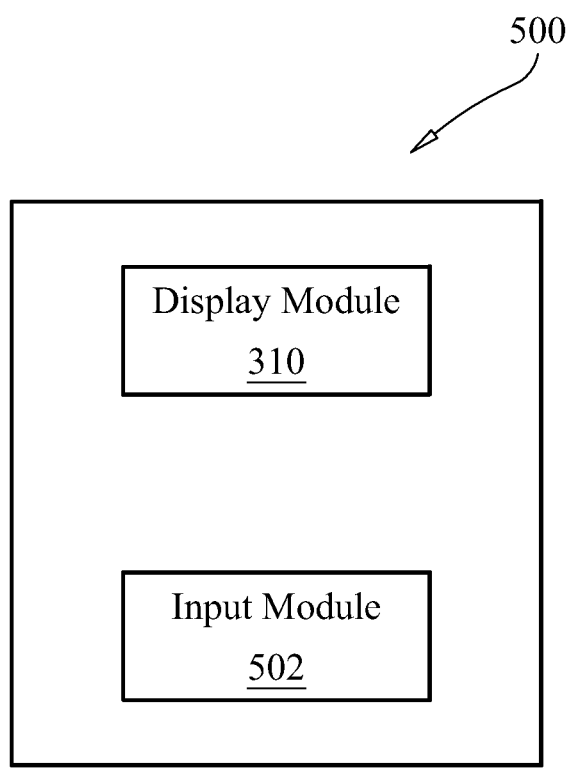
FIG. 5 shows a system in accordance with yet another embodiment.

FIG. 5 shows a system 500 in accordance with another embodiment, wherein system 500 comprises at least one display module 310 to display at least one piece of game content 148, and at least one input module 502 to receive information about game player's physical exercise 114 and/or moving parameters 112, 112'.

In one embodiment, at least one display module 310 may comprise a hardware aspect, such as a displaying device 106, which may include, but is not limited to, such as a displaying device 106, which may include, but is not limited to, may be any kind of displaying device 106, such as, but not limited to, a cell phone, a personal digital assistant ("PDA"), a computer monitor, a projector, a laptop, an ipad, a television, a notebook, a tablet personal computer, iPhone, smart phones, mobile phones, a portable screen, a portable processing device and/or any other kind of WLAN communication devices that are readily used in the arts. In another embodiment, at least one display module 310 may comprise a software aspect, such as, but not limited to, a display computer program or software, such as, but not limited to, a media player, display drivers, and the like. In yet another embodiment, at least one display module 310 may comprise both a hardware aspect and a software aspect.

In yet another embodiment, at least one input module 502 may comprise a hardware aspect, such as input hardware and/or a device, which may include, but is not limited to, a mouse, a keyboard, buttons, a touch screen, or a gesture control system. In another embodiment, at least one input module 502 may comprise a software aspect, such as, but not limited to, input software or an input computer program, which may include, but is not limited to, a user interface, a gesture user interface, input software, keystroke or input interpretation software, and the like. In yet another embodiment, at least one input module 502 may comprise both a hardware aspect and a software aspect.

In some embodiments, at least one piece of content may be any type of game content 148. Game content 148 as used herein may be any type of content, including but not limited to, game player's statistics 114, login status 214, crew member's login status 214', login history 216 (not shown), and crew member's game player's statistics 114', and the like as described above with reference to FIGS. 1 through 3.

In some embodiments, the at least one display module 310 comprises at least one displaying device 106 and/or display software, at least one input module 502 comprising of at least one user interface hardware and/or software, such as a keyboard for accessing the user interface to play the game 124.

Overview of Method Embodiments

Figure 6:
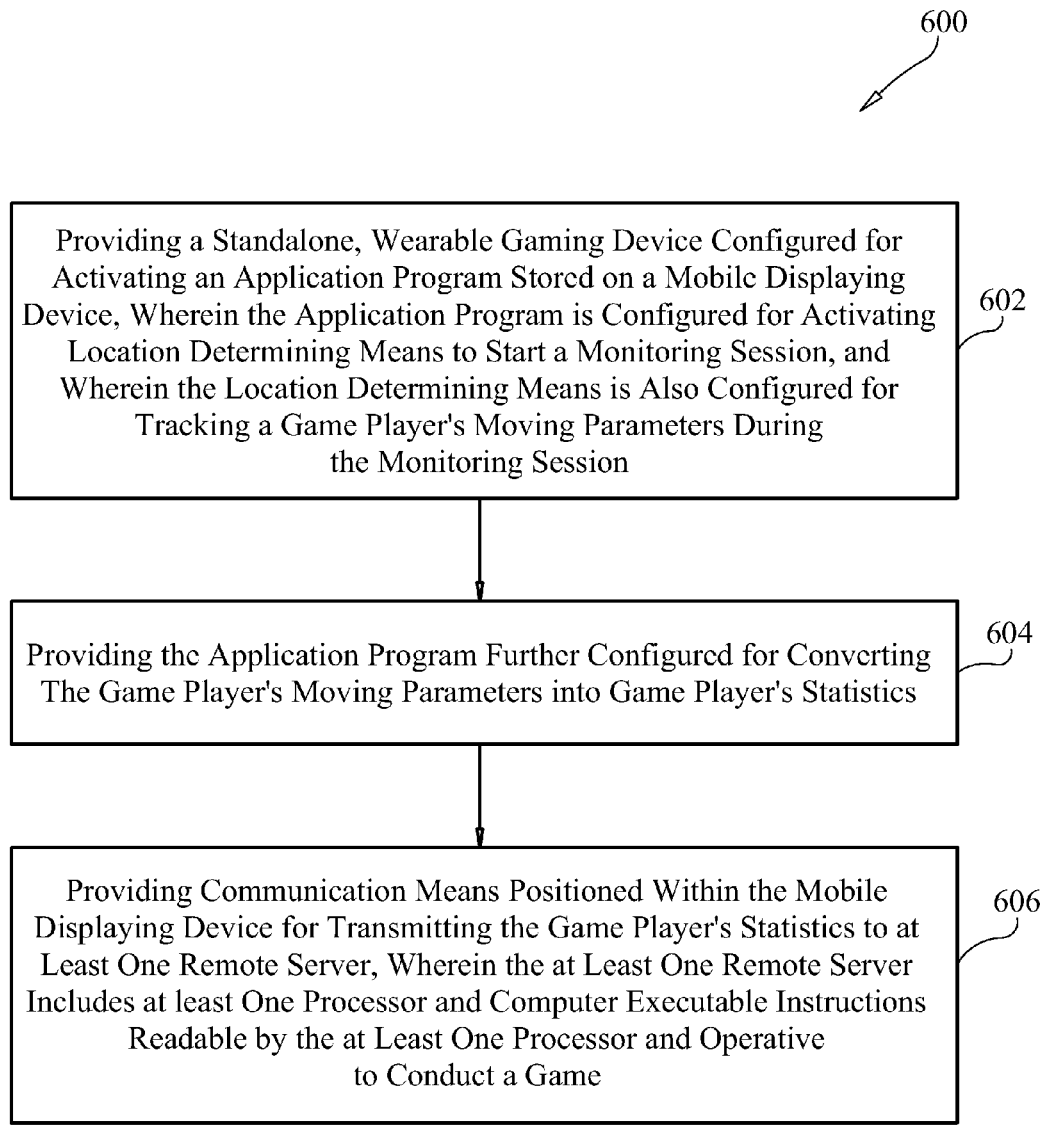
FIG. 6 shows a block diagram depicting a method in accordance with an embodiment.

Referring now to FIG. 6, a method 600 is shown, wherein method 600 comprises of providing a standalone, wearable gaming device 102 configured for activating an application program 104 stored on a mobile displaying device 106, wherein the application program 104 is configured for activating location determining means 108 to start a monitoring session 110, and wherein the location determining means 108 is also configured for tracking a game player's moving parameters 112, 112' during the monitoring session 110 while the game players engaged during an actual, real live sporting activity (step 602); providing the application program 104 which is further configured for converting the game player's moving parameters 112, 112' into game player's statistics 114 (step 604); and communication means 116 positioned within the mobile displaying device 106 for transmitting the game player's statistics 114 to at least one remote server 118, wherein the at least one remote server 118 includes at least one processor 120 and computer executable instructions 122 readable by the at least one processor 120 and operative to conduct a game 124 (step 606).

Gaming device 102 as described herein is in electronic communication with a wireless, portable mobile displaying device 106 and/or the remote processor 118. Gaming device 102 is enabled for attachment to any one of the following: footwear, clothing apparel or accessories and the like, whereby accessories may include any one of the following, belt, hat, bags, satchel, backpack and other like accessories. In some embodiments, the wearable gaming device 102 may be permanently attached to game player's shoe, apparel or other accessory while in other embodiments the gaming device 102 is portable and may be removably attached to game player's footwear, e.g. shoe's tongue, apparel, e.g. belt, pockets, etc. or an accessory, e.g. hat, backpack, satchel and the like providing for a variety of different game playing experiences.

Mobile displaying device 106 as used herein may be any kind of displaying device 106, such as, but not limited to, a cell phone, a personal digital assistant ("PDA"), a computer monitor, a projector, a laptop, an IPAD™, a television, a notebook, a tablet personal computer, IPHONE™, smart phones, mobile phones, a portable screen, a portable processing device and/or any other kind of WLAN communication devices that are readily used in the arts to display, transmit and/or receive wireless communications. Displaying device 106 may include a computer processor 120', with computer executable instructions 122' stored thereon and readable by the displaying device's computer processor 120', in electronic communication with the application program 104, displaying device's communication means 116' and/or the location determining means 108, whereby the processor's computer executable instructions 122' is programmed to access and control the application program 104, communication means 116' and/or the location determining means 108. As such, once the application program 104 has been activated, the processor 120 can communicate with the application program 104 and the communication means 116' to obtain the game player's moving parameters 112, 112' for transmission to the remote processor for tabulations and uploading the virtual mileage 128 earned into the social networking game 124. Processor 120 may be any type of processor 120, such as those processors 102, 102' which include processor modules 304 as previously described in reference to FIGS. 1A through 5.

In some embodiments, displaying device 106 is equipped with communication means 116 and location determining means 108 that are each either electrically or mechanically connected to at least one processor 120' positioned within the displaying device 106. In the case of electronic connections, the electronic connections may be wired and/or wireless. In some embodiments, location determining means 108 may comprise of the communication means 116, where the communication means 116 may be a wireless communication means 116, which employ short range wireless protocol, such as, but not limited to, a radio frequency transceiver, a radio frequency receiver, and/or a radio frequency transmitter.

Moving parameters 112, 112' as used herein includes but is not limited to any one or more of the following: a game player's unique identifier 134, a location determining means unique identifier 136, a geographical position 132 of the location determining means 108, distance travelled 130, speed 202, date 142, elevation height 144, timestamp 146 and or any other parameters associated with physical exercises 140, 140' that are known and used in the arts.

In some embodiments, the at least one moving parameter 112 originates from a location determining means 108 as previously described in conjunction with FIGS. 1A through 3, which when activated uses its at least one sensor 138 positioned within, to sense a game player of the location determining means physical exercises 140, 140'. The at least one sensor 138 may be any type of sensor, including, but not limited to, an accelerometer, or gyroscopic sensor camera. In some embodiments, the at least one sensor 138, includes an infrared camera, a panoramic sensor, a stereo sensor, a three dimensional sensor and/or camera ("3D sensor"), a thermal imaging camera, a video sensor, a digital camera, and the like. Physical exercises 140, 140' as used herein is selected from the group consisting essentially of: walking, sprinting, running, dribbling, jumping, batting, swinging, shooting, scoring a goal, skateboarding, lifting, jogging, swimming, hiking, skiing, boxing, snowboarding, dancing, diving, driving, flying, surfing, cycling, sliding, gliding, hurling, bending, pitching, throwing and/or any other physical activity.

Location determining means 108 includes communication means 116 that includes at least one communication means 116' for communicating with the displaying device 106 and/or the at least one processor 120 for transmitting and/or receiving at least one moving parameter 112 as previously described in conjunction with FIGS. 1-5.

In one embodiment, method 600 further comprises using at least one processor 120 to conduct a game 124 based on the received at least one moving parameter 112. For instance, after the location determining means 108 has been activated and the distance travelled 130 has been captured and transmitted to the processor 120, upon receipt of the same, processor 120 may use the distance travelled 110 of the game player's moving parameters 112, 112' to update the game player's statistics 118 or rank 146 based on the received at least one moving parameter 112. Game player's statistics 118 include but is not limited to a: distance travelled 110, virtual miles (accumulated) 204, speed 202, or any other game player statistics 114 that are known and used in the arts.

In yet a further embodiment, method 600 further comprises providing computer executable instructions 122 readable by the at least one processor 120 and operative to conduct a game 124, wherein the game 124 is further configured for: awarding virtual mileage 128 for actual distance travelled 130 which correspond to a virtual mileage 128 requirement for navigating through e.g. a virtual city; awarding virtual mileage 128 based on the game player successfully navigating through a challenge; conferring a rank 146 to the game player based on a totality of accumulated virtual mileage 128; awarding prizes to top earners of accumulated virtual mileage 128 within a prescribed period; requiring the game player to complete individual tricks in order to be promoted to a different game level; updating the game player's statistics 114 or rank 146 based on the received at least one moving parameter 112; or transmitting to or receiving game content 148 from the displaying device 106, which may be displayed on the displaying device's displaying means.

Method further comprises conducting a social networking game 124 where the game content 148 may be transmitted or received by the displaying device 106. Game content 148 as used herein may be any type of content 148, including but not limited to, game player's statistics 114, rank 146, login status 214, login history 216 (not shown), crew member's login status 206', and crew member's game player's statistics 114', and the like. In this manner, a game player may view his/her rank 146 or virtual mileage 128 on the displaying device 106 wherein the displaying device 106 is equipped with displaying means for displaying the game content 148. In other embodiments, game player 150 may access his or her game player's statistics 114 from an application accessible from a media website, e.g. Facebook, where game player may view his/her game player's statistics 114 as updated by the processor 120 using the at least one moving parameter 112 transmitted by the displaying device 106 or the location determining means 108.

In yet a further embodiment, method 600 further comprises using at least one processor 120 to determine game player's virtual mileage 128 based on the game player's statistics 114 which are converted into virtual mileage 128. As previously discussed, the more virtual mileage 128 a game player accumulates it will improve his or her rank 146.

In some embodiments, method 600 further comprises using at least one processor 120 to confer a rank 146 on the game player based on a plurality of received moving parameters 112, 112'. For instance, if game player has accumulated virtual mileage 128 based on the distance travelled 110, then the processor 120 may upgrade game player to a new rank 146 commensurate with the distance travelled 110 for that particular rank 146.

Figure 7:
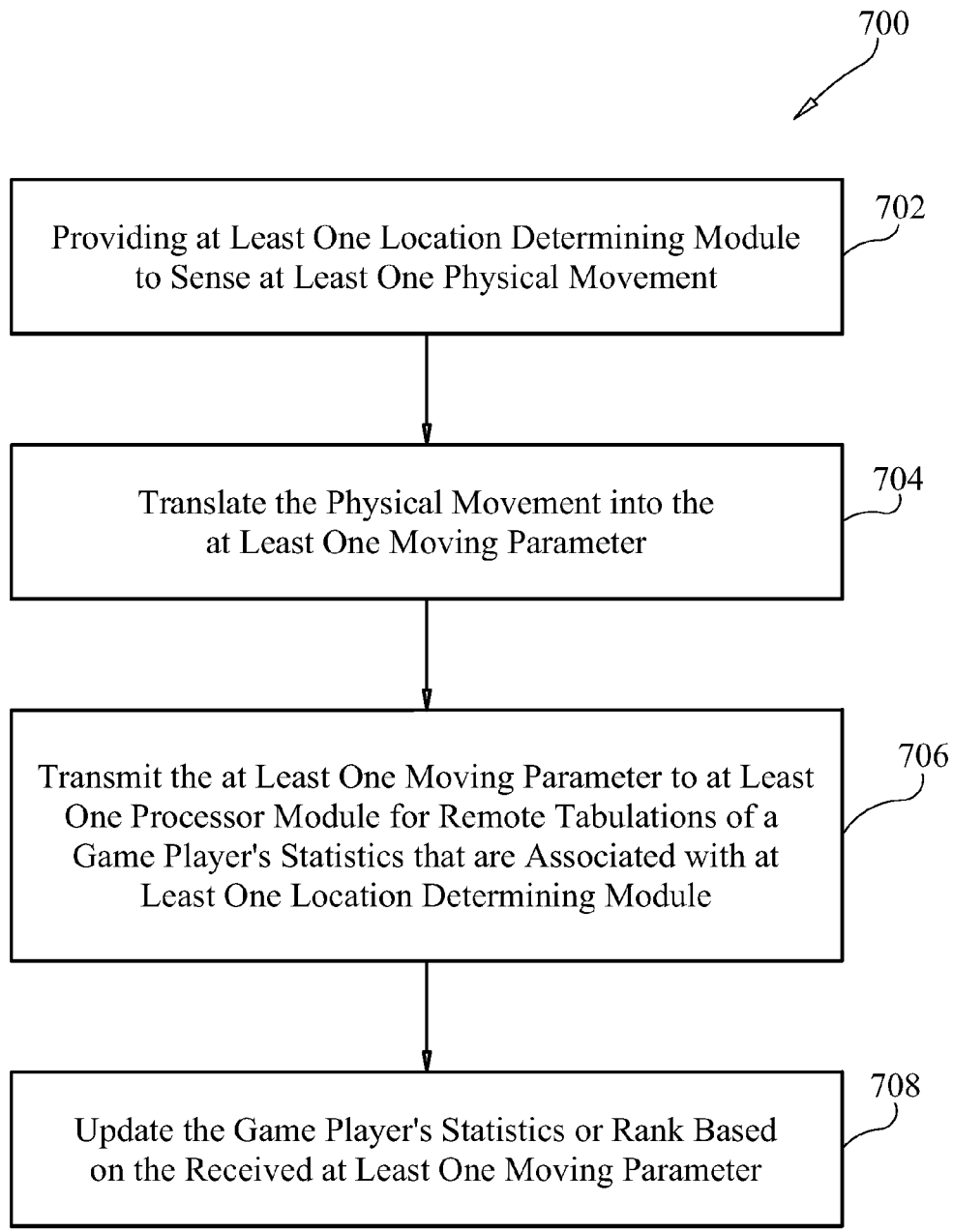
FIG. 7 shows a block diagram depicting a method in accordance with another embodiment.

Referring now to FIG. 7, which shows a block diagram depicting a method 700 in accordance with another embodiment. In some embodiments, displaying device 106 is equipped with displaying means 214 for displaying game content 148. Displaying means 214 may include but is not limited to a liquid crystal display ("LCD") or light emitting diode ("LED") type, plasma, touch screen or any other types of displays that are well known and used in the arts. Displaying device 106 may display the game content 148 either in text and/or visual format. In some embodiments, displaying device 106 may be equipped with speakers such that the game content 148 may be broadcasted orally.

As such, method 700 comprises of providing at least one location determining module 302 to sense at least one physical movement 114 (step 702), wherein the at least one location determining module 302 translates the physical exercises 140, 140' into the at least one moving parameter 112 (step 704). Location determining module 302 may be in direct communication with a communications module 308' which communicate with the processor module 302, such that the communications module 308 transmits the at least one moving parameter 112 to at least one processor module 102 for tabulations of a game player's statistics 114 that are associated with the at least one location determining module 302 (step 706). Upon receipt of the at least one moving parameter 112, processor module 302 may update the game player's statistics or rank based on the received at least one moving parameter (step 708).

In some embodiments, the at least one location determining module 302 also includes a processor module 102 programmable to update the game player's statistics or rank based on the received at least one moving parameter (step 708).

Overview of Computer Readable Medium Embodiments

Another embodiment may comprise of a computer readable medium having computer executable instructions 122 operative to use at least one sensor 138 to sense a game player of the location determining means physical exercise 114.

The computer readable medium may be any type of computer readable medium, such as, but not limited to, a memory chip, a hard drive, a CD-ROM, a DVD-ROM, a CD-RW, a USB memory stick, flash memory, random access memory, and the like.

Another embodiment may comprise a computer readable medium having computer executable instructions 122 operative to perform any of the operations previously described with reference to FIGS. 1A through 7.

Overview of Hardware and Operating Environment

This section provides an overview of example hardware and the operating environments in conjunction with which embodiments of the inventive subject matter can be implemented.

A software program may be launched from a computer readable medium in a computer-based system to execute function defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 10 below.

Figure 8:
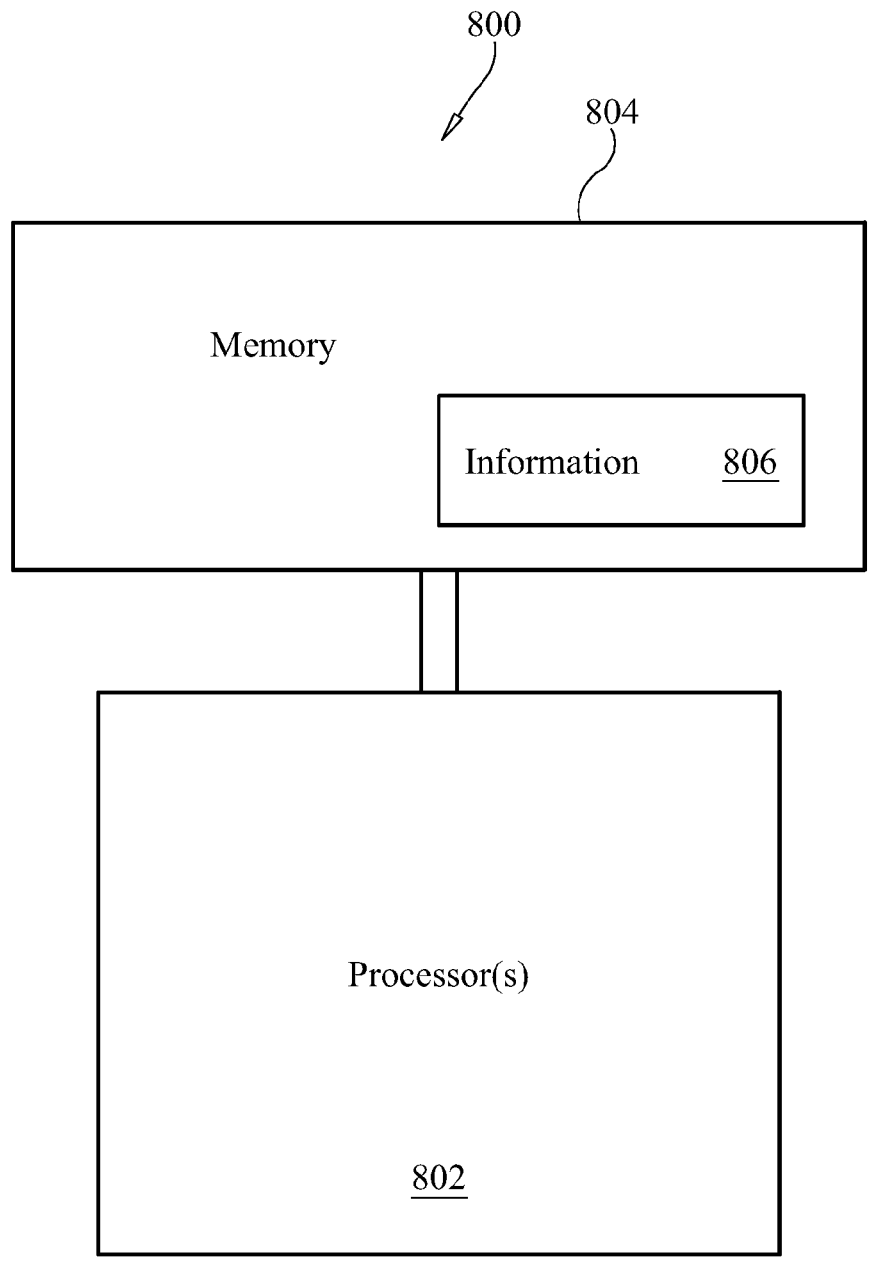
FIG. 8 shows a block diagram depicting an article in accordance with one embodiment.

FIG. 8 is a block diagram representing an article according to various embodiments. Such embodiments may comprise a computer, a memory system, a magnetic or optical disk, some other storage device, or any type of electronic device or system. The article 800 may include one or more processor(s) 802 coupled to a machine-accessible medium such as a memory 804 (e.g., a memory including electrical, optical, or electromagnetic elements). The medium may contain associated information 806 (e.g., computer program instructions, data, or both) which, when accessed, results in a machine (e.g., the processor(s) 802) performing the activities previously described herein.

The principles of the present disclosure may be applied to all types of computers, systems, and the like, include desktop computers, servers, notebook computers, personal digital assistants, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A social networking game system comprising of:
   (a) standalone, wearable gaming device configured for activating an application program stored on a mobile displaying device, wherein the application program is configured for activating location determining means to start a monitoring session where upon activation, a location determining means calculates a geographical position and a game player's performance metrics, and wherein a location determining means includes at least one sensor for sensing the game player's performance metrics during physical exercise during the monitoring session thereby originating at least one moving parameter for the game player;
   (b) the application program is further configured for converting the at least one game player's moving parameters into a plurality of game player's statistics; and
   (c) communication means positioned within the mobile displaying device for transmitting the game player's statistics to at least one remote server, wherein the at least one remote server includes at least one processor and computer executable instructions readable by the at least one processor and operative to conduct a game, wherein the game is configured for:
   (i) receiving the game player statistics;
   (ii) identifying a game player's account for which the game player's statistics will apply;
   (iii) converting the game player's statistics into virtual mileage based on a correlation to actual distance travelled during the monitoring session;
   (iv) updating the game player's account to include a game player virtual mileage accumulated during the monitoring session;
   (v) awarding virtual mileage to the game player for each crew member that accesses the game;
   (vi) displaying the game player's virtual mileage on the social networking game; or
   (vii) determining a winner for the game player with the most accumulated virtual mileage within a prescribed period.

2. The system of claim 1, wherein the wearable gaming device is enabled for attachment to any one of the following: footwear, apparel or accessories.

3. The system of claim 1, wherein the moving parameters include but is not limited to any one or more of the following: geographical coordinates of the location determining means, actual distance travelled, speed, stride rate, cycling cadence, date, elevation reached, depth travelled, timestamp, a location determining means' unique identifier and a game player's unique identifier.

4. The system of claim 1, wherein the location determining means may be positioned within the mobile displaying device or the gaming device.

5. The system of claim 2, wherein the wearable gaming device is attached to the footwear's tongue.

6. The system of claim 5, wherein physical exercises are selected from the group consisting essentially of: walking, sprinting, running, dribbling, jumping, batting, swinging, shooting, scoring a goal, skateboarding, lifting, jogging, swimming, hiking, skiing, boxing, snowboarding, dancing, diving, driving, flying, surfing, cycling, sliding, gliding, hurling, bending, pitching and throwing.

7. The system of claim 5, wherein performance metrics may include but is not limited to speed, average speed, maximum speed, number of sprints, distance, distance at high intensity levels, steps, heart rate, heart rate and/or stride rates.

8. The system of claim 1, wherein the game is further configured for:
   (a) awarding virtual mileage for actual distance travelled which correspond to a virtual mileage requirement for navigating through a virtual city;
   (b) awarding virtual mileage based on the game player successfully navigating through a challenge;
   (c) conferring a rank to the game player based on a totality of accumulated virtual mileage;
   (d) awarding prizes to top earners of accumulated virtual mileage within a prescribed period;
   (e) requiring the game player to complete individual tricks in order to be promoted to a different game level
   (f) updating the game player's statistics or rank based on the received at least one moving parameter; or
   (g) transmitting to or receiving game content from the mobile displaying device.

9. The system of claim 1, wherein game player's statistics include but is not limited to a: virtual miles, actual distance travelled, speed, or rank.

10. The system of claim 1, wherein the displaying device is equipped with at least one displaying means for displaying game content.

11. The system of claim 10, wherein game content includes but is not limited to a: game player's statistics, login status, login history, crew member's login status, and crew member's game player's statistics.

12. The system of claim 1, wherein the computer executable instructions are further operative to determine game player's virtual miles based on the game player's at least one moving parameter transmitted or received to or from the at least one location determining means or the displaying device.

13. A method of conducting a social networking game comprising of:
   (a) standalone, wearable gaming device configured for activating an application program stored on a mobile displaying device, wherein the application program is configured for activating location determining means to start a monitoring session where upon activation, a location determining means calculates a geographical position and a game player's performance metrics, and wherein a location determining means includes at least one sensor for sensing the game player's performance metrics during physical exercise during the monitoring session thereby originating at least one moving parameter for the game player;
   (b) providing the application program further configured for converting the game player's at least one moving parameter into a plurality of game player's statistics; and
   (c) providing communication means positioned within the mobile displaying device for transmitting the game player's statistics to at least one remote server, wherein the at least one remote server includes at least one processor and computer executable instructions readable by the at least one processor and operative to conduct a game, wherein the game is configured for:
   (i) receiving the game player statistics;
   (ii) identifying a game player's account for which the game player's statistics will apply;
   (iii) converting the game player's statistics into virtual mileage based on a correlation to actual distance travelled during the monitoring session;

(iv) updating the game player's account to include a game player virtual mileage accumulated during the monitoring session;
(v) awarding virtual mileage to the game player for each crew member that accesses the game;
(vi) displaying the game player's virtual mileage on the social networking game; or
(vii) determining a winner for the game player with the most accumulated virtual mileage within a prescribed period.

14. The method of claim 13, wherein the wearable gaming device is enabled for attachment to any one of the following: footwear, apparel or accessories.

15. The method of claim 13, wherein the moving parameters include but is not limited to any one or more of the following: geographical coordinates of the location determining means, actual distance travelled, speed, stride rate, cycling cadence, date, elevation reached, depth travelled, timestamp, a location determining means' unique identifier and a game player's unique identifier.

16. The method of claim 13, wherein the location determining means may be positioned within the mobile displaying device or the gaming device.

17. The method of claim 14, wherein the wearable gaming device is attached to the footwear's tongue.

18. The method of claim 17, wherein physical exercises are selected from the group consisting essentially of: walking, sprinting, running, dribbling, jumping, batting, swinging, shooting, scoring a goal, skateboarding, lifting, jogging, swimming, hiking, skiing, boxing, snowboarding, dancing, diving, driving, flying, surfing, cycling, sliding, gliding, hurling, bending, pitching and throwing.

19. The method of claim 17, wherein performance metrics may include but is not limited to speed, average speed, maximum speed, number of sprints, distance, distance at high intensity levels, steps, heart rate, heart rate and/or stride rates.

20. The method of claim 13, wherein the game is further configured for:
(a) awarding virtual mileage for actual distance travelled which correspond to a virtual mileage requirement for navigating through a virtual city;
(b) awarding virtual mileage based on the game player successfully navigating through a challenge;
(c) conferring a rank to the game player based on a totality of accumulated virtual mileage;
(d) awarding prizes to top earners of accumulated virtual mileage within a prescribed period;
(e) requiring the game player to complete individual tricks in order to be promoted to a different game level
(f) updating the game player's statistics or rank based on the received at least one moving parameter; or
(g) transmitting to or receiving game content from the displaying device.

21. The method of claim 13, wherein game player's statistics include but is not limited to a: virtual miles, actual distance travelled, speed, or rank.

22. The method of claim 13, wherein the displaying device is equipped with at least one displaying means for displaying game content.

23. The method of claim 20, wherein game content includes but is not limited to a: game player's statistics, login status, login history, crew member's login status, and crew member's game player's statistics.

24. The method of claim 13, wherein the computer executable instructions are further operative to determine game player's virtual miles based on the game player's at least one moving parameter transmitted or received to or from the at least one location determining means or the displaying device.

* * * * *